United States Patent [19]

Suzuki et al.

[11] Patent Number: 4,800,258
[45] Date of Patent: Jan. 24, 1989

[54] INFORMATION RECORDING-REPRODUCING APPARATUS

[75] Inventors: Kenichi Suzuki; Kazuo Minoura, both of Yokohama, Japan

[73] Assignee: Canon Kabushiki Kaisha, Tokyo, Japan

[21] Appl. No.: 919,505

[22] Filed: Oct. 16, 1986

[30] Foreign Application Priority Data

Oct. 18, 1985 [JP] Japan .................................. 60-231393

[51] Int. Cl.$^4$ .............................................. G06K 13/04
[52] U.S. Cl. .................................... 235/479; 235/475; 360/2; 360/88
[58] Field of Search ...................... 235/475, 479, 480; 360/2, 88

[56] References Cited

U.S. PATENT DOCUMENTS

| | | | |
|---|---|---|---|
| 3,896,291 | 7/1975 | Wiedeman | 235/480 |
| 4,141,044 | 2/1979 | Kistner et al. | 235/475 X |
| 4,150,784 | 4/1979 | Moorman et al. | 235/479 |

Primary Examiner—David L. Trafton
Attorney, Agent, or Firm—Fitzpatrick, Cella, Harper & Scinto

[57] ABSTRACT

An information recording-reproducing apparatus, in which an information recording medium is held on a supporting table and the supporting table is reciprocally moved relative to a recording and/or reproducing head thereby to accomplish recording and/or reproduction of information, has means for feeding the information recording medium onto the supporting table and/or means for taking out the information recording medium from the supporting table.

5 Claims, 1 Drawing Sheet

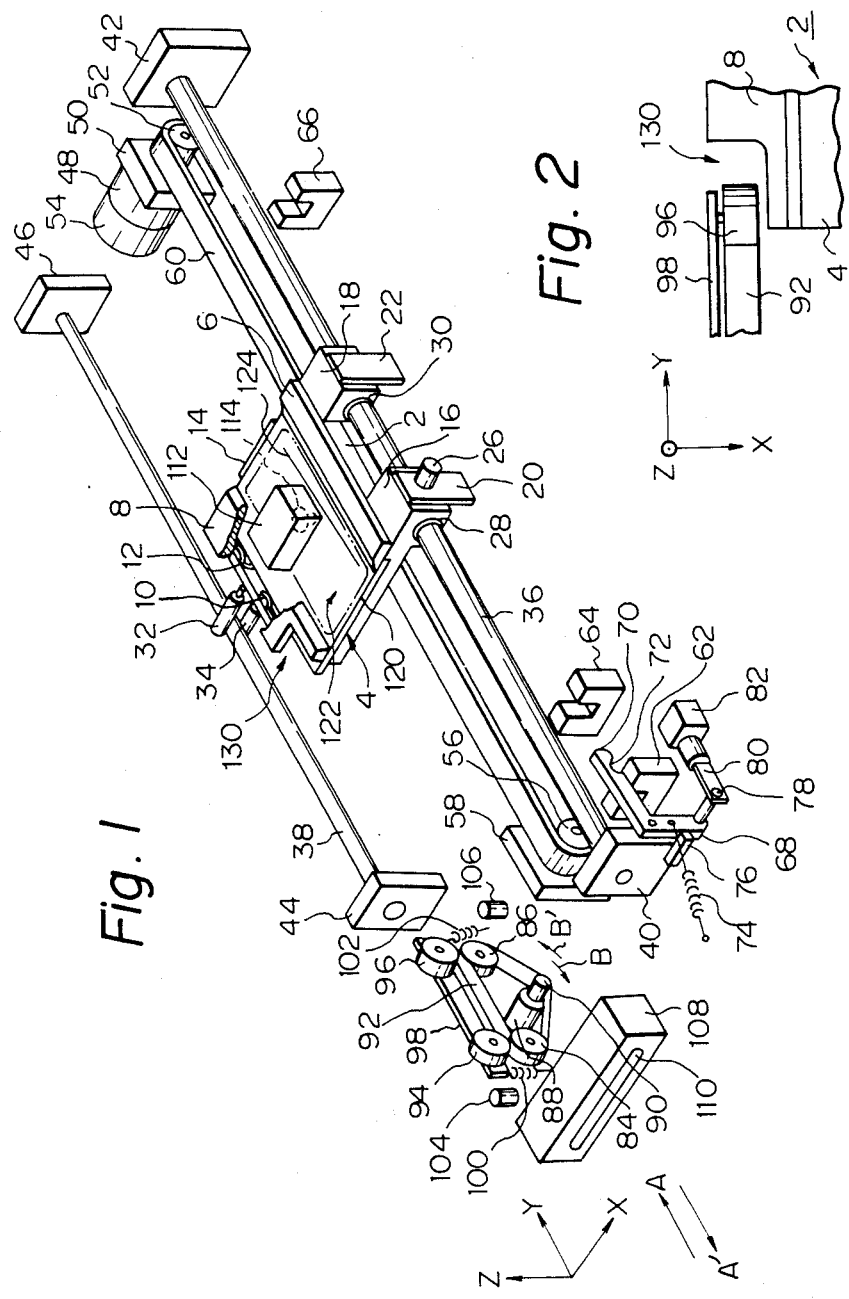

INFORMATION RECORDING-REPRODUCING APPARATUS

BACKGROUND OF THE INVENTION

1. Field of the Invention

This invention relates to an apparatus for recording information on a recording medium and/or reproducing the information recorded on the recording medium, and in particular to an information recording-reproducing apparatus in which a card-like or sheet-like recording medium and a head unit for information-processing the medium are reciprocally moved relative to each other to thereby accomplish recording and/or reproduction of information.

Such an information recording-reproducing apparatus can suitably utilized as an optical information recording-reproducing apparatus or a magnetic information recording-reproducing apparatus.

2. Related Background Art

Various forms such as a card-like form, a disk-like form and a tape-like form are known as the forms of a recording medium used to record information by the use of a light beam and to reproduce the thus recorded information by the use of a light beam. In particular, an optical information recording medium formed into a card-like shape (hereinafter referred to as the "optical card") is expecting a great demand as a recording medium which is easy to manufacture, excellent in portability and good in accessibility.

In the optical card, information tracks are formed straight and a number of such information tracks are arranged parallel to one another on a predetermined area of the surface of the card. Accordingly, in an information recording-reproducing apparatus using the optical card as a recording medium, a light beam spot is continuously moved relative to, and along, the surface of the optical card in the direction of the information tracks, and at this time, recording or reproduction of information is effected. After a predetermined distance of movement, the light beam spot is moved relatively over a predetermined distance on the surface of the optical card in a direction across the direction of the information tracks, and at this time, recording or reproduction of information is not effected. Then, the light beam spot is again continuously moved relatively in the direction of the information tracks, and at this time, recording or reproduction of information is effected, and thereafter, in a similar manner, the relative movement in the direction of the information tracks and the relative movement in the direction across the direction of the information tracks are alternately repeated a desired number of times.

As an information recording-reproducing apparatus which effects the operation as described above, there is conceivable an apparatus of the type in which an optical card is held on a supporting table (hereinafter referred to as the "shuttle") and the shuttle is reciprocally moved in the direction of the information tracks, while, on the other hand, a head unit for forming a light beam spot on the information tracks of the optical card is moved in a direction across the information tracks.

As regards the optical card, a person usually must carry it with him or her, feed it to a predetermined holding position on the shuttle of the apparatus of the described type during recording or reproduction and further take it out from said predetermined holding position.

Now, in recent years, enhanced speed of information recording and reproduction has been desired and therefore, in the information recording-reproducing apparatus of the above-described type, it is desirable that the optical card be held accurately and firmly at a predetermined position on the shuttle so that no positional deviation of the optical card may occur when the shuttle is reciprocally moved at a high speed and when the direction of movement of the shuttle is reversed.

However, when a person performs the operation of directly positioning the optical card on the shuttle, the then operating conditions will become very irregular, and this leads to a problem that the person cannot cause the optical card to be held at a proper position and it will adversely affect the recording and/or reproduction. There is also a problem in that the operation performed by the person is complicated and the optical card is readily damaged during the operation.

SUMMARY OF THE INVENTION

According to the present invention, to solve the above-noted problems peculiar to the prior art, there is provided an information recording-reproducing apparatus in which an information recording medium is held on a supporting table and said supporting table is reciprocally moved relative to a recording and/or reproducing head thereby to accomplish recording and/or reproduction of information, characterized by means for feeding the information recording medium onto said supporting table and/or means for taking out the information recording medium from said supporting table.

BRIEF DESCRIPTION OF THE DRAWINGS

FIG. 1 is a perspective view of the apparatus of the present invention.

FIG. 2 is a fragmentary plan view of the apparatus of the present invention.

DESCRIPTION OF THE PREFERRED EMBODIMENT

A specific embodiment of the present invention will hereinafter be described with reference to the drawings.

FIG. 1 is a schematic perspective view showing an embodiment of the information recording-reproducing apparatus of the present invention. The present embodiment is applied to an optical information recording-reproducing apparatus.

In FIG. 1, reference numeral 2 designates a shuttle formed with a planar portion 4 for supporting an optical card thereon. The optical card may be fed onto and taken out of the supporting portion 4 in a predetermined direction relative to portion 4, denominated the Y direction. The shuttle 2 is also formed with members 6 and 8 having a sufficient degree of springiness for pressing the optical card downwardly (shown as the negative Z direction) when the optical card is fed onto or taken out of the supporting portion 4 and when it is supported in place. The shuttle 2 also has members 10 and 12 having a degree of springiness, attached thereto, for lightly pressing the optical card in the X direction, i.e., perpendicularly to the Y and Z directions, against an opposed wall surface when the optical card is fed onto or taken out of the supporting portion 4 and when the optical card is supported in place. The shuttle 2 further has a stopper 14 attached thereto for positioning the optical card in the Y direction when the optical card is fed onto the supporting portion 4. Two protruding portions 16 and 18 are formed on one side of the shuttle 2, and light-intercepting plates 20 and 22 are fixed to the protruding portions 16 and 18, respectively. A pin 26 extending in the X direction is secured to the protruding portion 16. The protruding portions 16 and 18 are formed with coaxial through-holes extending in the Y direction, and bearings 28 and 30 are mounted in the through-holes. Two guide rollers 32 and 34 are attached to the other side of the shuttle 2, and these rollers are disposed parallel to each other at a suitable interval in the Z direction and are freely rotatable about axes extending in the X direction.

In FIG. 1, reference numerals 36 and 38 designate guide members each comprising a cylindrical body extending in the Y direction. The opposite ends of the guide members 36 and 38 are supported by support members 40, 42 and 44, 46, respectively. The support members are all fixed to a frame, not shown. One guide member 36 is slidably fitted to the bearings 28 and 30 in the protruding portions 16 and 18 formed on the shuttle. The other guide member 38 is located at a level between the two guide rollers 32 and 34 attached to the shuttle 2. The guide rollers 32 and 34 hold the guide member 38 therebetween and are movable relative to the guide member 38 in the Y direction. The junction between the guide member 36 and the bearings 28, 30 and the junction between the guide member 38 and the guide rollers 32, 34 have such a degree of minimum play that permits smooth reciprocal movement of the shuttle 2 relative to the guide members 36 and 38 in the Y direction.

In FIG. 1, reference numeral 48 denotes a servomotor which is supported by a support member 50. The driving rotary shaft of the motor 48 extends in the X direction and has a pulley 52 mounted thereon. The motor 48 has a tachogenerator 54 attached thereto for detecting the number of revolutions thereof. On the other hand, reference numeral 56 designates a pulley supported at the same level as the pulley 52 by a support member 58 so as to be rotatable about an axis extending in the X direction. A belt 60 is passed over and between the two pulleys 52 and 56, and a part of the upper moving portion of the belt is fixed to the underside of the shuttle 2. The support members 50 and 58 are both fixed to a frame, not shown.

In FIG. 1, reference numerals 62, 64 and 66 denote photocouples for detecting that the light-intercepting plates 20 and 22 attached to the protruding portions 16 and 18 of the shuttle 2 have arrived at the detecting position when the shuttle 2 is moved in the Y direction.

In FIG. 1, reference numeral 68 designates a hook-shaped lever which is supported at its bent portion by the support member 40 for pivotal movement about an axis extending in the X direction. The horizontal portion of the lever 68, which extends substantially in the Y direction, has an inclined surface 70 formed on the underside of the fore end portion thereof, and a recess 72 is formed in a portion thereof which is between surface 70 and the bent portion. The recess 72 is of a shape substantially corresponding to the upper surface of the pin 26 secured to the protruding portion 16 of the shuttle 2 and is situated substantially at the same level as the pin 26. The vertical portion of the lever 68 extends substantially in the Z direction and one end of a spring 74 is connected to substantially the midpoint thereof. The other end of the spring 74 is connected to a frame, not shown. Reference numeral 76 denotes a stopper for restraining the rotation of the lever 68 by the spring 74.

The stopper 76 is fixed to the support member 40. A pin 78 extending in the X direction is secured to the tip end of the vertical portion of the lever 68, and one end of a connecting member 80 is connected to the tip end of the pin 78 so as to be pivotable about an axis extending in the X direction. The connecting member 80 is situated substantially horizontally and the other end thereof is connected to the acting portion of a solenoid 82. Thus, by the solenoid 82 being operated, the vertical portion of the lever 68 is pulled against the tensile force of the spring 74 and thus, the lever 68 is pivoted counterclockwise about its pivot axis which lies in the X direction, as viewed in FIG. 1, by a suitable angle, and the horizontal portion thereof is moved upward.

In FIG. 1, reference numerals 84 and 86 designate rollers which are both mounted on a frame, not shown, at the same level so as to be rotatable about axes extending in the X direction. Reference numeral 88 denotes a drive motor. The driving rotary shaft of the motor 88 extends in the X direction and has a pulley 90 mounted thereon. A belt 92 is passed over and between the pulley 90 and the rollers 84, 86. Reference numerals 94 and 96 designate keep rollers which are both mounted on one side of a movable plate 98 so as to be rotatable about axes extending in the X direction. The roller 94 is situated above the roller 84, and the roller 96 is situated above the roller 86. The movable plate 98 is movable in the Z direction along guide means, not shown, and one end of a spring 100 and one end of a spring 102 are connected to the opposite ends, respectively, of the movable plate 98. The other ends of these springs are connected to a frame, not shown, and accordingly, the rollers 94 and 96 are normally biased downward. The direction in which the belt 92 moves horizontally between the rollers 84 and 86 is in the Y direction, and the moving portion of this belt exists substantially at the same level as the optical card supporting portion 4 of the shuttle 2.

In FIG. 1, reference numerals 104 and 106 designate sensors for detecting the passage of the optical card therebelow. The sensors 104 and 106 are situated above the horizontal path of the belt 92. Reference numeral 108 denotes an optical card insertion portion formed with an opening 110 for inserting the optical card in the Y direction therethrough. The opening 110 is situated at a position substantially corresponding to the card supporting portion 4 of the shuttle 2 with respect to the X direction and is also situated substantially at the same level as the horizontally moving portion of the belt 92, and extends in the Y direction. The sensors 104, 106 and the card insertion portion 108 are mounted on a frame, not shown.

Further, in FIG. 1, reference numeral 112 denotes an optical head unit which is situated above the optical card supporting portion 4 of the shuttle 2 and which can radiate a light beam 114 downward. The head unit 112 is mounted on a frame, not shown, so as to be reciprocally movable in the X direction by an actuator, not shown.

In FIG. 1, the optical card 120 is supported and held on the optical card supporting portion 4 of the shuttle 2 and the shuttle 2 is in the recording and/or reproducing position. The optical card 120 is of a rectangular shape having two sides extending in each of the X direction and the Y direction and has a suitable thickness extending in the Z direction. A recording area 122 is provided on the surface of the optical card 120, and a number of information tracks 124 parallel to the Y direction are formed on the recording area 122. The recording area 122 exists between the card keep members 6 and 8. The optical card 120 is held down on the supporting portion 4 by the card keep members 6 and 8 and is also held down against the opposed wall surfaces in the X direction by the springy members 10 and 12, and has its Y direction end brought into contact with the stopper 14.

In the present embodiment, a cut-away portion 130 is formed at a location whereat the supporting portion 4 of the shuttle 2 and the card keep member 8 are opposed to the rollers 86 and 96, and in this portion, a corner of the optical card 120 protrudes from the shuttle 2.

Operation of the apparatus of the present embodiment as described above will now be explained.

The shuttle 2 is in a position wherein the pin 26 attached to the protruding portion 16 thereof is engaged with the recess 72 formed in the horizontal portion of the lever 68. In this state, the light-intercepting plate 20 attached to the protruding portion 16 of the shuttle 2 is in the detecting position of the photocouple 62. Further, in this state, the rollers 86 and 96 are positioned in the cut-away portion 130 of the card supporting portion 4 of the shuttle 2 and the card keep member 8. FIG. 2 is a schematic fragmentary plan view showing the then positional relation between the cut-away portion 130 and the roller 96.

Then, the operator inserts the optical card into the opening 110 of the card insertion portion 180 in the direction of arrow A. When the leading end of the inserted optical card arrives at the detecting position of the sensor 104 and is detected, the drive motor 88 is operated by the instruction of the control unit and the pulley 90 is rotated in the direction of arrow B, so that the belt 92 passed over this pulley and the rollers 84, 86 is moved. The horizontally moving portion of the belt 92 moves in the direction of arrow A and, as this movement progresses, the rollers 94 and 96 are rotated. When the optical card is further inserted in the direction of arrow A and the leading end thereof arrives at the portion between the rollers 84 and 94, the optical card is nipped between the horizontally moving portion of the belt 92 and the roller 94 and guided in the direction of arrow A by guide means, not shown. The optical card is moved in the direction of arrow A and the leading end thereof passes between the rollers 86 and 96 and advances onto the card supporting portion 4 of the shuttle 2, which lies at the same level. At this time, the optical card is held down on the supporting portion 4 by the card keep members 6 and 8 and is held down against the opposed wall surfaces in the X direction by the spring members 10 and 12, but since the optical card feed-in force based on the drive force of the motor 88 and the tensile forces of the springs 100 and 102 is greater than the friction force based on the pressing forces of said members 6, 8, 10 and 12, the optical card advances further and at last, the leading end thereof strikes against the stopper 14 attached to the shuttle 2. Simultaneously therewith, the trailing end of the optical card arrives at the detecting position of the sensor 106 and is detected thereby, whereupon the revolution of the drive motor 88 is stopped by the instruction of the control unit and further, the solenoid 82 is operated and the lever 68 is pivoted counter-clockwise as viewed in FIG. 1, whereby the engagement of the pin 26 of the shuttle 2 with the recess 72 of the lever 68 is released, and then the servo-motor 48 is driven to move the belt 60 and thus, the shuttle 2 fixed to the belt 60 is moved in the direction of arrow A. The operation of the solenoid 82 is stopped after the movement of the shuttle 2 has been started. A portion of the trailing end of the optical card is nipped by and between the rollers 86 and 96 with the belt 92 interposed therebetween when this movement of the shuttle 2 is started, but since the optical card is already held down on the supporting portion 4 of the shuttle 2 by the keep members 6 and 8, the trailing end of the optical card rotates or moves the rollers 84, 86, 94, 96, the pulley 90 and the belt 92 by the friction force and thus, the optical card overcomes the friction force provided by its being nipped between the rollers 86 and 96 and is moved in the direction of arrow A. As an alternative method, it would occur to one to move the movable plate 98 upward when this movement is started, and to release the pressing of the optical card by the pulley 96, thereby reducing the friction force.

When the movement of the shuttle 2 is started, the output of the tachogenerator 54 is detected and the number of revolutions of the motor 48 is controlled by the instruction of the control unit so as to be a predetermined value. Thus, the shuttle 2 is moved in the direction of arrow A at a predetermined velocity. When the light-intercepting plate 22 attached to the protruding portion 18 of the shuttle 2 arrives at the detecting position of the photocouple 66 and detection is effected, the number of revolutions of the motor 48 is reduced by the instruction of the control unit and the movement velocity of the shuttle 2 is decreased and at last, the shuttle is stopped. Simultaneously with this stoppage, the motor 48 starts its reverse revolution in response to the instruction of the control unit and the number of revolutions thereof is gradually increased, and thus, the shuttle 2 is accelerated in the direction of arrow A', which is opposite to the direction of arrow A. During the movement in this direction, as during the movement in the direction of arrow A, the number of revolutions of the motor 48 is controlled by the instruction of the control unit on the basis of the detection of the output of the tachogenerator 54 so as to be a predetermined value. Toward the time when the light-intercepting plate 22 arrives at the detecting position of the photocouple 66, the movement velocity of the shuttle 2 attains a predetermined value of the same magnitude as that during the movement in the direction of arrow A, and thereafter the shuttle 2 is moved at this predetermined velocity. When the light-intercepting plate 20 attached to the protruding portion 16 of the shuttle 2 arrives at the detecting position of the photocouple 64 and detection is effected, the deceleration and stoppage of the movement of the shuttle 2 in the direction of arrow A' and the acceleration of the shuttle in the direction of arrow A take place in the same manner as that when the light-intercepting plate 22 has arrived at the detecting position of the photocouple 66, and toward the time when the light-intercepting plate 20 arrives at the detecting position of the photocouple 64, the shuttle is moved in the direction of arrow A at a predetermined velocity similar to that mentioned above. Thereafter, in a similar manner, the shuttle 2 is reciprocally moved in the Y direction.

During the reciprocal movement as described above, a light beam 114 is emitted from the optical head unit 112, whereby recording of information is effected on the recording area 122 of the optical card 120 or reproduction of the information recorded on said recording area is effected. During this recording or reproduction, when (or before or after) the movement of the shuttle 2 in Y direction is reversed, the optical head unit 112 is moved in the X direction by a predetermined distance (that, is, the interval between the information tacks 124 in the X direction or a distance an integral ref number of times as great as said interval) and thus, the light beam 114 forms a spot on a desired information track 124 on the optical card 120 and scanning is effected in succession.

Once the recording or reproducing operation has been terminated, deceleration of the motor 48 is effected after the light-intercepting plate 20 arrives at the detecting position of the photocouple 64, and this motor is controlled so that it is stopped just when the light-intercepting plate 20 has arrived at the detecting position of the photocouple 62. Accordingly, the shuttle 2 is moved in the direction of arrow A', the pin 26 attached to the protruding portion 16 thereof comes to bear against the inclined part 70 of the horizontal portion of the lever 68 to rotate this lever counter-clockwise against the tensile force of the spring 74 and at last, the pin 26 arrives at a position corresponding to the recess 72 of the lever 68 and is brought into engagement with the recess 72 by the tensile force of the spring 74. In this state, the shuttle 2 and the roller 96 assume a positional relation as shown in FIG. 2, and that portion of the optical card positioned in the cut-away portion 130 of the shuttle 2 is nipped by and between the rollers 86 and 96 with the belt 92 interposed therebetween. On the other hand, when the light-intercepting plate 20 arrives at the detecting position of the photocoupler 62 and detection is effected, the motor 88 is revolved by the instruction of the control unit in the direction of arrow B', which is opposite to the direction of arrow B, and thus, the horizontal moving portion of the belt 92 is moved in the direction of arrow A'. By this drive force, the optical card nipped between the rollers 86 and 96 is drawn out from the supporting portion 4 of the shuttle 2 in the direction of arrow A' against the friction force based on the pressing force of the keep members 6 and 8. The optical card is then moved in the direction of arrow A' while being pressed on the belt 92 by the rollers 96 and 94 and at last, it is discharged through the opening 110 of the feed-in portion 108, and the operator pulls out the optical card in the direction of arrow A'. When the sensor 104 detects the termination of the passage of the optical card, the motor 88 is stopped by the instruction of the control unit.

According to the present embodiment, the optical card feed-in and draw-out means comprising chiefly the members 88-102 and the cut-away portion 130 of the shuttle 2 can assume the disposition shown in FIG. 2 and therefore, by this means, the optical card can be fed in to the predetermined optical card holding means of the shuttle 2 and accurately positioned thereon, and also the optical card lying at such position can be immediately drawn out.

In the above-described embodiment, the optical card feed-in means serves also as the optical card draw-out means, whereby compactness of the apparatus can be achieved, but the present invention also covers a form in which the feed-in means and the draw-out means are provided discretely from each other, for example, a form in which the means such as 88-102 in the above-described embodiment and the means such as the card insertion portion 108 are disposed on the opposite sides of the shuttle with respect to Y direction and one of them is used for the card feed-in and the other is used for the card discharge.

Also, in the above-described embodiment, the directions of card feed-in and draw-out of the optical card feed-in and draw-out means are the same as the directions of reciprocal movement of the shuttle 2, but the present invention also covers an embodiment in which the card feed-in direction and/or the card draw-out direction is another direction, for example, a direction perpendicular to the directions of reciprocal movement of the shuttle.

Further, the above embodiment has been described with respect to a case where the recording and/or reproduction of information on the recording medium is carried out by the use of a light beam, but the present invention also covers a form in which the recording and/or reproduction of information on the recording medium is carried out by other system, for example, a form in which recording and/or reproduction of information is magnetically carried out on the recording medium.

According to the present invention as described above, the feeding of the recording medium onto the supporting table and/or the removal of the recording medium from the supporting table can be automatically accomplished under predetermined conditions and particularly, the recording medium can be fed always accurately to a predetermined location on the supporting table and therefore, recording and/or reproduction can be accomplished under very good conditions, and the recording medium when fed in or drawn out is not damaged and the operator's handling of the card becomes good.

What is claimed is:

1. An information recording-reproducing apparatus comprising:
   support means for supporting an information recording medium;
   a head for effecting at least one of recording and reproducing of information;
   means for reciprocally moving said support means relative to said head to accomplish at least one of recording and reproduction of information;
   means for effecting at least one of feeding of the information recording medium onto said support means and taking out of the information recording medium from said support means; and
   locking means for locking said support means in the case that the information recording medium is fed onto said support mean.

2. An information recording-reproducing apparatus according to claim 1, wherein the feed-in direction of said recording medium feeding means or the take-out direction of said recording medium taking-out means, respectively, is substantially the same as directions of reciprocal movement of said support means.

3. An information recording-reproducing apparatus according to claim 1, wherein recording or reproduction of information is done by the use of a light beam.

4. An information recording-reproducing apparatus according to claim 1, wherein said recording medium feeding means is designed to feed the recording medium to a holding position on said support means.

5. An information recording-reproducing apparatus according to claim 1, wherein said recording medium taking-out means is designed to take out the recording medium from a holding position on said supporting table.

* * * * *

UNITED STATES PATENT AND TRADEMARK OFFICE
CERTIFICATE OF CORRECTION

PATENT NO. : 4,800,258

DATED : January 24, 1989

INVENTOR(S) : KENICHI SUZUKI, ET AL.

It is certified that error appears in the above-identified patent and that said Letters Patent is hereby corrected as shown below:

COLUMN 6

Line 52, " that" should be deleted.

COLUMN 7

Line 1, "information tacks 124" should read
--information tracks 124--.

COLUMN 8

Line 48, "support mean." should read --support means.--.

Signed and Sealed this

Twenty-second Day of August, 1989

Attest:

DONALD J. QUIGG

Attesting Officer

Commissioner of Patents and Trademarks